(12) United States Patent
Beardsley et al.

(10) Patent No.: US 10,038,895 B2
(45) Date of Patent: Jul. 31, 2018

(54) IMAGE CAPTURE DEVICE CALIBRATION

(71) Applicants: Paul Beardsley, Zurich (CH); Anselm Grundhoefer, Greifensee (CH); Daniel Reetz, Los Angeles, CA (US)

(72) Inventors: Paul Beardsley, Zurich (CH); Anselm Grundhoefer, Greifensee (CH); Daniel Reetz, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 876 days.

(21) Appl. No.: 13/742,256

(22) Filed: Jan. 15, 2013

(65) Prior Publication Data

US 2014/0198221 A1   Jul. 17, 2014

(51) Int. Cl.
| | |
|---|---|
| *H04N 17/00* | (2006.01) |
| *G01B 7/004* | (2006.01) |
| *G01B 21/04* | (2006.01) |
| *G01B 11/00* | (2006.01) |

(52) U.S. Cl.
CPC .......... *H04N 17/002* (2013.01); *G01B 7/004* (2013.01); *G01B 11/002* (2013.01); *G01B 21/042* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0252474 A1* | 11/2006 | Zalewski | ................ | A63F 13/10 463/1 |
| 2006/0252475 A1* | 11/2006 | Zalewski | ................ | A63F 13/02 463/1 |
| 2006/0252541 A1* | 11/2006 | Zalewski | ................ | A63F 13/02 463/36 |
| 2006/0256081 A1* | 11/2006 | Zalewski | ................ | A63F 13/06 345/156 |
| 2006/0264260 A1* | 11/2006 | Zalewski | ................ | A63F 13/06 463/36 |
| 2008/0009348 A1* | 1/2008 | Zalewski | ................ | A63F 13/10 463/40 |
| 2009/0231425 A1* | 9/2009 | Zalewski | ................ | H04N 7/18 348/142 |

(Continued)

FOREIGN PATENT DOCUMENTS

| | | |
|---|---|---|
| JP | 2011149908 | 8/2011 |
| KR | 101214082 B1 | 12/2012 |

OTHER PUBLICATIONS

Anonymous, "Personal Navigation Assistant," Wkipedia, Jan. 10, 2013, XP055114102, URL: http://en.wikipedia.org/w/index.php?title=Personal_navigtion_assistant&oldid=532294669.

*Primary Examiner* — Tsung-Yin Tsai

(74) *Attorney, Agent, or Firm* — Patent Ingenuity, P.C.; Samuel K. Simpson

(57) ABSTRACT

A three-dimensional coordinate position of a calibration device is determined. Further, a code is emitted to an image capture device. The code indicates the three-dimensional coordinate position of the calibration device. In addition, an image of light emitted from the calibration device is captured. The light includes the code. An image capture device three-dimensional coordinate position of the calibration device is calibrated according to the real world three-dimensional coordinate position of the calibration device indicated by the code.

23 Claims, 6 Drawing Sheets

(56) References Cited

U.S. PATENT DOCUMENTS

| | | | | |
|---|---|---|---|---|
| 2010/0150404 A1* | 6/2010 | Marks | ........................ | G06T 7/20 |
| | | | | 382/107 |
| 2010/0302378 A1* | 12/2010 | Marks | .................... | G01S 3/7803 |
| | | | | 348/169 |
| 2013/0028475 A1* | 1/2013 | Ganick | ................. | G01C 21/206 |
| | | | | 382/103 |
| 2013/0060520 A1* | 3/2013 | Amor | ................... | G01C 15/008 |
| | | | | 702/154 |

* cited by examiner

IMAGE CAPTURE DEVICE CALIBRATION

BACKGROUND

1. Field

This disclosure generally relates to the field of image capture systems. More particularly, the disclosure relates to camera calibration.

2. General Background

Camera calibration is currently utilized in a variety of areas to find the correspondence of a real world coordinate system with a coordinate system of a camera. Camera calibration is often utilized to calibrate projector-camera systems. Further, camera calibration is often utilized to calibrate multi-camera systems that track people and their interactions.

Current approaches to calibrating one or more cameras utilize a checkerboard target, a distinctive point such as a light emitting diode ("LED") light source that is moved from position to position, or multiple naturally occurring points in a scene. In the approach that utilizes the checkerboard target, the one or more cameras are typically directed toward the checkerboard target that is typically held by a human. The calibration involves the human adjusting the checkerboard to be located at different ranges from the camera with different inclinations. In the approach that utilizes a moving distinctive point, the one or more cameras are typically directed toward the distinctive point that is typically held by a human. The calibration involves the human moving the distinctive point through a variety of positions. With respect to the approach that utilizes multiple naturally occurring points in a scene, the multiple naturally occurring points must have an appropriate distribution in the scene. Otherwise, the calibration will not be correct, e.g., the calibration will not be correct if the naturally occurring points lie on a line or a plane.

The approaches with the checkerboard and the moving distinctive point often have unskilled workers performing the tasks incorrectly. Uncertainty and wasted time often result. If the human does not perform the calibration task correctly, the calibration approaches do not provide helpful diagnostic messages that aid the user in performing the calibration task correctly.

Further, the current calibration approaches do not fully specify the real world coordinate system because they do not specify the position of the origin of the real world coordinate system or the orientation of the axes of the real world coordinate system. An additional step is necessary to fully specify the real world coordinate system, which typically involves a human providing a manual input for the camera images. This additional step requires extra work and is often a source of error.

In addition, the current calibration approaches do not specify scene information such as the location of the ground plane in the world coordinate frame. An additional step is necessary to specify such information, which typically involves a human providing a manual input for the camera images. This additional step also requires extra work and is often a source of error.

It is believed that improvements are needed to provide better diagnostics for camera calibration and to provide a better methodology to specify the origin of the world coordinate frame and the orientation of the axes. It is also believed that improvements are needed to provide a better methodology to specify scene information such as the location of the ground plane.

SUMMARY

In one aspect of the disclosure, a calibration device is described. The calibration device comprises a controller that determines a three-dimensional coordinate position of the calibration device. Further, the calibration device comprises at least one light emitter that emits a code to an image capture device. The code indicates the three-dimensional coordinate position of the calibration device.

In another aspect of the disclosure, an image capture device is described. The image capture device comprises an image capture sensor that captures an image of light emitted from a calibration device. The light includes a code that indicates a real world three-dimensional coordinate position of the calibration device. Further, the image capture device comprises a controller that calibrates at least one intrinsic parameter and at least one extrinsic parameter according to a real world three-dimensional coordinate position of the calibration device indicated by the code.

In yet another aspect of the disclosure, a system is described. The system comprises a calibration device that includes a controller and at least one light emitter. The controller determines a three-dimensional coordinate position of the calibration device, the at least one light emitter emitting a code to an image capture device. The code indicates the three-dimensional coordinate position of the calibration device. Further, the system comprises an image capture device that includes an image capture sensor and a controller. The image capture sensor captures an image of light emitted from a calibration device, the light including the code. The controller calibrates an image capture device three-dimensional coordinate position of the calibration device according to the real world three-dimensional coordinate position of the calibration device indicated by the code.

In another aspect of the disclosure, a process is described. The process determines a set of three-dimensional coordinate positions of a calibration device. Further, the process emits a code to an image capture device. The code indicates the three-dimensional coordinate position of the calibration device. In addition, the process captures an image of light emitted from the calibration device. The light includes the code. The process also calibrates an image capture device three-dimensional coordinate position of the calibration device according to the set of real world three-dimensional coordinate positions of the calibration device indicated by the code.

In yet another aspect, an image capture device is described. The image capture device comprises a lens. Further, the image capture device comprises an image capture sensor that captures an image of light emitted from a calibration device through the lens, the light including a code that indicates a real world three-dimensional coordinate position of the calibration device.

In another aspect, a robotic calibration apparatus is described. The robotic calibration apparatus comprises a calibration device that includes a controller and at least one light emitter. The controller determines a three-dimensional coordinate position of the calibration device, The at least one light emitter emits a code to an image capture device. The code indicates the three-dimensional coordinate position of the calibration device. Further, the robotic calibration apparatus comprises a robotic platform that is operably connected to the calibration device to move the at least one light emitter to an additional three-dimensional coordinate position that is distinct from the three-dimensional coordinate position.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 3A illustrates a calibration configuration in which an optical receiver distinct from the image capture device receives the location data from the calibration device.

FIG. 3B illustrates a calibration configuration in which the optical receiver is connected directly to the image capture device.

DETAILED DESCRIPTION

A calibration system is utilized to calibrate a coordinate system of an image capture device with a real world coordinate system. The calibration system improves image capture calibration by automatically providing diagnostics in the event that calibration was not performed correctly. Such information may be helpful to a user that is involved in the calibration process. Further, particular directions are provided to the user on actions to be performed to obtain a correct calibration.

Figure 1:
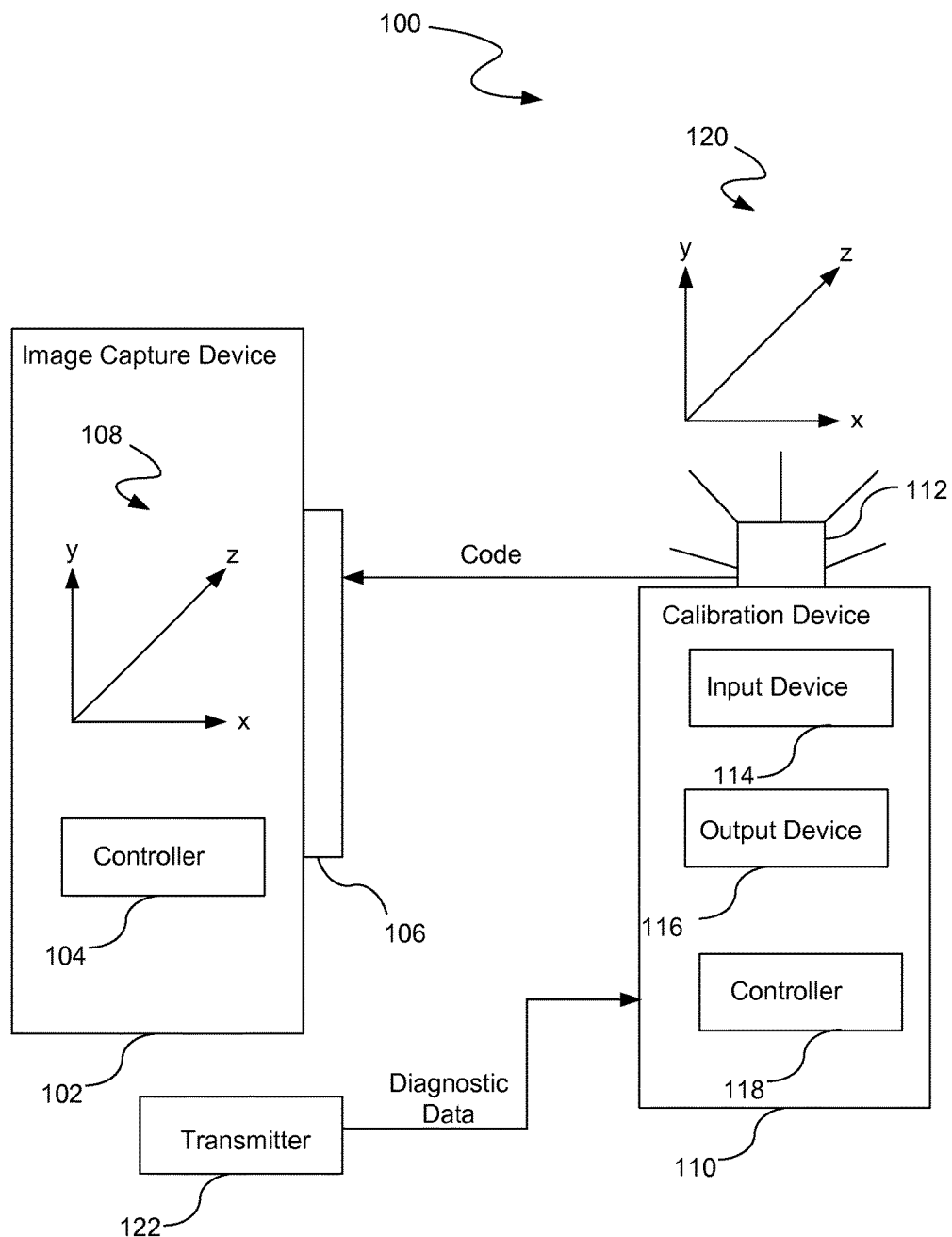
FIG. 1 illustrates a calibration system.

FIG. 1 illustrates a calibration system 100. The camera calibration system includes an image capture device 102, a calibration device 110, and a transmitter 122. An example of an image capture device 102 is a camera. The image capture device 102 has a controller 104, a lens 106, and an image capture device three-dimensional coordinate system 108. The image capture device three-dimensional coordinate system 108 is an example of intrinsic data for the lens 106 of the image capture device 102. In one aspect, transmitter 122 is utilized to provide diagnostic data in the event of incorrect calibration. The transmitter is operably connected to the calibration device 112, e.g., through a cable connection, a wireless connection, or the like. In another aspect, the calibration system 100 does not utilize the transmitter 122, e.g., diagnostic data may be provided from human interaction such as verbal or visual cues. A user analyzes a set of (x, y, z) positions and determines if the calibration device 110 was properly moved around the workspace. That user provides instructions to another user operating the calibration device 110 to move to new positions in the workspace.

Further, the calibration device 110 has a light emitter 112, an input device 114, and a controller 116. The light emitter 112 emits light such as visible light, infrared light, RGB light, or the like. Further, the light emitter 112 may emit a combination of various types of light. The light emitter 112 is illustrated as being attached to the exterior of the calibration device 112. As an example, a light emitting diode ("LED") or a plurality of LEDs is utilized as the light emitter 112. Alternatively, the light emitter 112 is integrated within the calibration device 110. As another alternative, the light emitter 112 is a separate device that is operably connected to the calibration device 110 through a cable connection, wireless connection, or the like.

In one aspect, a user utilizes the input device 114 to input data. An example of the input device 114 is a keypad with letters and/or numbers. A user enters data relevant to the position of the calibration device 110 into the input device 114. As an example, the user enters information about particular corners of a location that is being calibrated. In another aspect, the calibration device 112 does not have the input device 114 as user input may not be necessary.

In one aspect, the calibration device 112 has an output device 116. An example of the output device 116 is a display screen. The output device 116 is utilized to display diagnostic data received from the transmitter 122. In another aspect, the calibration device 112 does not utilize the output device 116. In such an instance, the calibration device 112 may receive diagnostic data through human interaction.

The controller 118 determines the location of the calibration device 110, i.e., the real world three-dimensional coordinate position on a real world three dimensional coordinate system 120. The controller 118 may utilize one or more of a variety of different location systems to determine the location of the calibration device 110, e.g., GPS systems or the like.

The calibration device 110 acts as an intelligent calibration target for the image capture device 102. The controller 118 provides the x, y, and z coordinates of the real world position of the calibration device 110 to the light emitter 112 so that the light emitter 112 visually emits or visually broadcasts a code with the current (x, y, z) position. The image capture device 102 or any other image capture device that views the light emitter 112 can decode and record the current position of the light emitter 112 along with the corresponding image position. The image capture device 102 or an operably connected processor performs calibration from the real world three dimensional coordinate system 118 to the image capture device three-dimensional coordinate system 108. The code may include a single (x, y, z) position. As a result, multiple codes may be emitted such that each code represents the current (x, y, z) position. Alternatively, a code may include multiple (x, y, z) positions, e.g., each code is sequenced according to time.

In one aspect, the camera calibration device 110 has or is in operable communication with an encoder that encodes the three-dimensional coordinate position of the calibration device 110 into the code. Further, the camera calibration device 110 has or is in operable communication with a modulator that modulates the code into a light signal emitted by the at least one light emitter 112. The position information is modulated into the light signal utilizing one or more modulation techniques, e.g., amplitude modulation, frequency modulation, pulse-width modulation ("PWM"), or the like.

In another aspect, the image capture device 102 has or is in operable communication with a demodulator that demodulates the light from the calibration device to obtain the code. Further, the image capture device 102 has or is in operable communication with a decoder that decodes the code to determine the set of real world three-dimensional coordinate positions of the calibration device.

This methodology determines a set of correspondences of (x. y, z) positions of the moving calibration target and the corresponding (x, y) pixels of the image plane. Such data provides enough information, e.g., intrinsics, extrinsics, and radial distortion, for calibration of the image capture device 102. The controller 104 performs the calibration. Alternatively, a processor of another device that is operably connected to or in operable communication with the image capture device 102 performs the calibration.

The controller 104 is illustrated as being integrated within the image capture device 102. Alternatively, the controller 104 may be distinct from the image capture device 102 and operably connected to the image capture device 102.

The calibration device 110 may be implemented in a variety of configurations. As an example, the calibration device 110 is a mobile device that a user carries from position to position so that the image capture device 102 captures the light emitted from the light emitter 112. The mobile device may also be an existing computing device, e.g., a notebook computer, a laptop, a smartphone, a tablet device, or the like, that is adapted for utilization as the calibration device 110. As an example, a tablet device is utilized as the calibration device 110. The display screen of the tablet device is utilized as the light emitter 112 to display a coded pattern with the (x, y, z) position of the calibration device 110 that is captured by the image capture device 102. As another example, the calibration device 110 is implemented on a robotic platform that automatically moves the light emitter 112 through a sequence of positions. The robotic platform may be placed on the ground by the user or may be positioned on a small mobile platform that is capable of traversing the workspace. Utilizing the robotic platform removes human error from the calibration procedure.

Further, the calibration device 110 may include onboard 3D sensors to obtain 3D information about the scene. An example of an onboard 3D sensor that is utilized to obtain 3D information about a scene is an altimeter that senses the height of the calibration device 110 above ground level. Other examples include a laser tape measure, a laser scanner, a depth sensor that detects 3D data for the surroundings, a Global Positioning System ("GPS"), a Wi-Fi positioning system, an infrared ("IR") positioning system, or the like. The onboard 3D sensors are utilized for calibration with scene information in contrast with previous approaches that calibrate cameras without scene information, i.e., by separately generating a 3D model of the scene and then registering the coordinate frame of the calibrated cameras with the coordinate frame of the scene model. The onboard 3D sensors allow for a scene model to be generated in conjunction with the calibration of the cameras.

In one aspect, the code includes both the current (x, y, z) position and the scene information. In another aspect, different codes are utilized for the current (x, y, z) position and the scene information.

Figure 2:
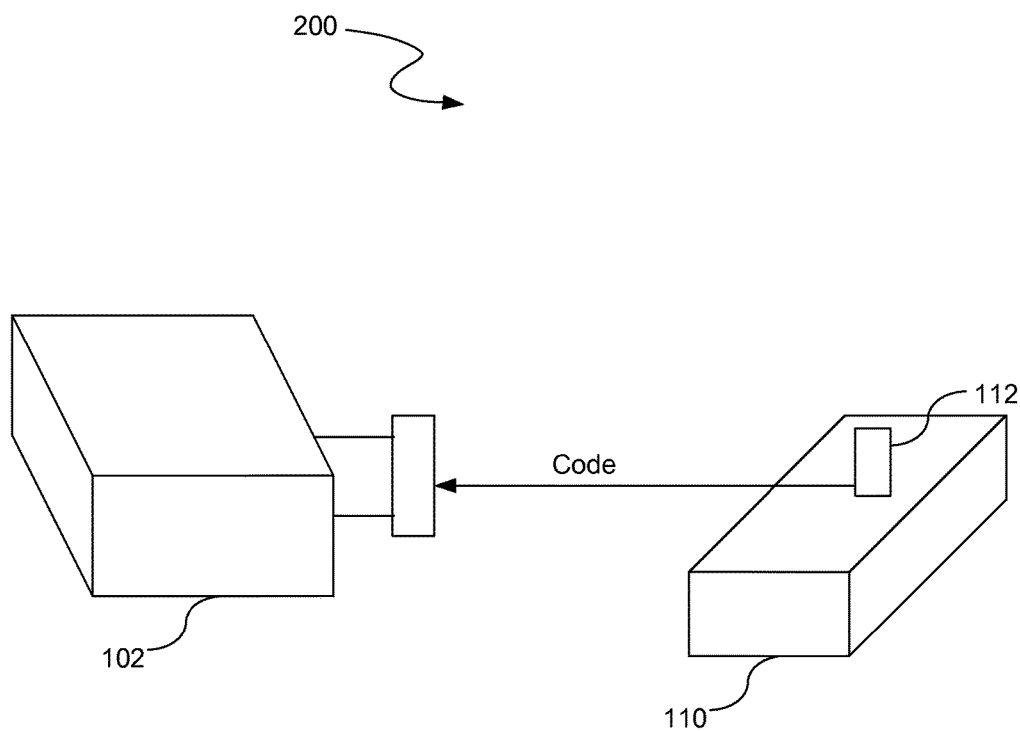
FIG. 2 illustrates a calibration configuration in which a coded pattern is blinked for calibration.

FIG. 2 illustrates a calibration configuration 200 in which a coded pattern is blinked for a calibration. The image capture device 102 is illustrated as a camera for illustrative purposes in FIG. 2. The light emitter 112 blinks the location information of the calibration device 110 in a coded pattern. The data and the visual scene information are captured by the image capture device 102 through a camera lens. In such an instance, the camera frame rate is utilized to measure the potential speed of the light emission by the light emitter 112. For example, a camera speed of thirty frames per second allows for one blink by the light emitter 112 every one thirtieth of a second.

Although a single LED is illustrated, a plurality of LEDs may be utilized as the light emitter 112. As an example, twenty four LEDs each simultaneously blink a particular bit of information. As a result, twenty four bits of information are emitted simultaneously. Each coordinate is represented by eight bits such that an (x, y, z) coordinate is represented by the twenty four bits of information, i.e., eight bits for the x coordinate, eight bits for the y coordinate, and eight bits for the z coordinate. As yet another alternative, the vertices of a cube each emit a bit of information that compose to form the code with the (x, y, z) coordinate. As a result of utilizing a plurality of LEDs, the (x, y, z) coordinate information may be emitted relatively fast.

Figure 3A:
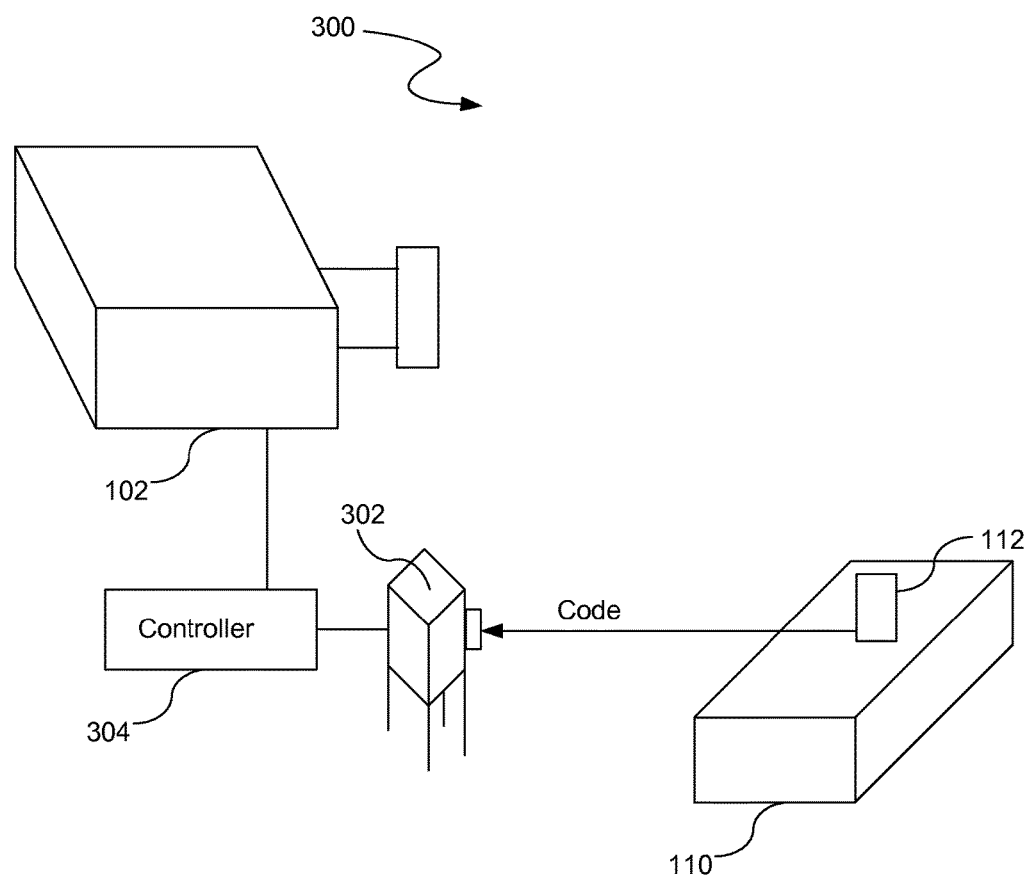
FIGS. 3A and 3B illustrate variations in which image data and location data may be received by different hardware.
Figure 3B:
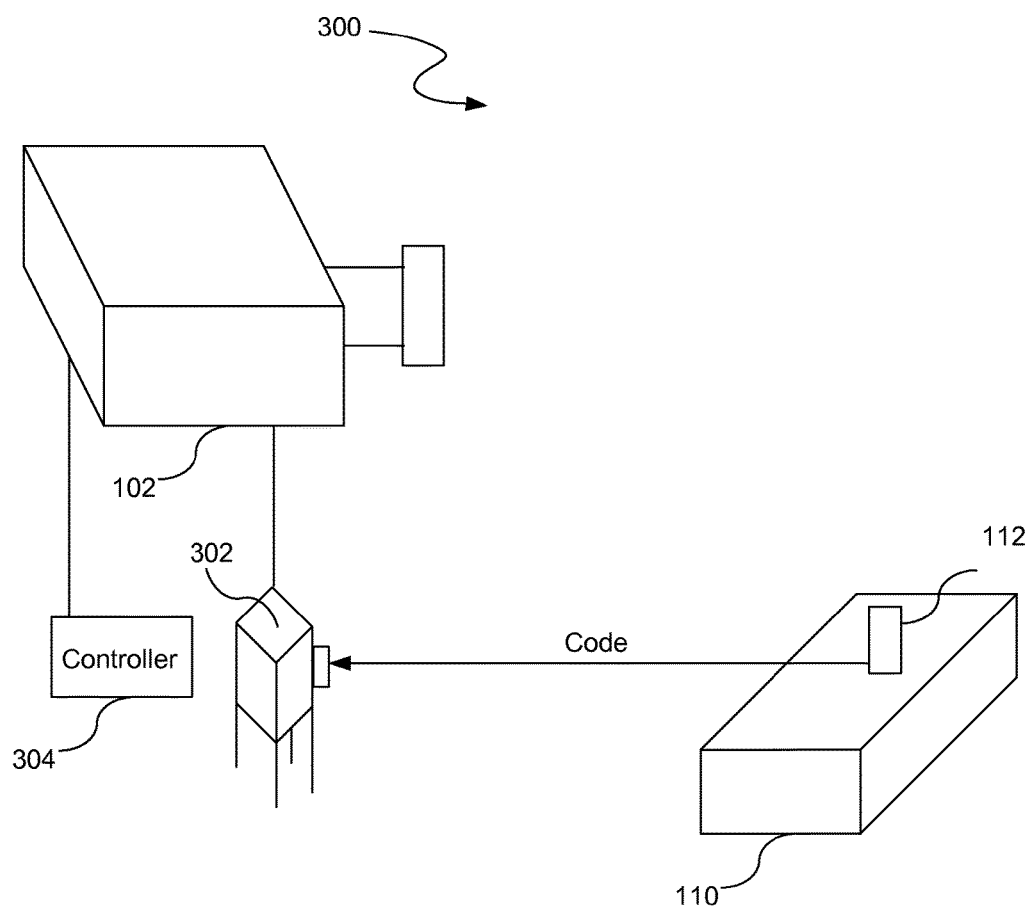

The calibration configuration 200 illustrated in FIG. 2 utilizes an image capture device 102 that functions to receive the location data from the calibration device 110 in addition to the image data that an image capture device 102 typically receives. FIGS. 3A and 3B illustrate variations in which image data and location data may be received by different hardware.

FIG. 3A illustrates a calibration configuration 300 in which an optical receiver 302 distinct from the image capture device 102 receives the location data from the calibration device 110. The optical receiver 302 receives the location data at a faster rather than that of the image capture device 110. As an example, an infrared receiver is operably connected to a controller 304, which is operably connected to the image capture device 102. The operably connections may be cable connections, wireless connections, or the like. The light emitter 112 emits light at a high rate such that the light appears solid to the image capture device 102, but is perceivable as blinked light by the optical receiver 302.

The controller 304 is illustrated as being distinct from the image capture device 102. In one aspect, the controller 104 performs the functionality described with respect to FIG. 1 and the controller 304 coordinates the interaction between the image capture device 102 and the optical receiver 302. In another aspect, the controller 104 performs the functionality described with respect to FIG. 1 and the coordination between the image capture device 102 and the optical receiver 302. In yet another aspect, the image capture device 102 does not have the controller 104 and relies on the controller 304 to perform the controller functionality described with respect to FIG. 1 and the coordination between the image capture device 102 and the optical receiver 302.

FIG. 3B illustrates a calibration configuration 350 in which the optical receiver 302 is connected directly to the image capture device 302. As an example, the optical receiver 302 is a photocell or other optical detector that is connected directly to the image capture device 102.

Figure 4:
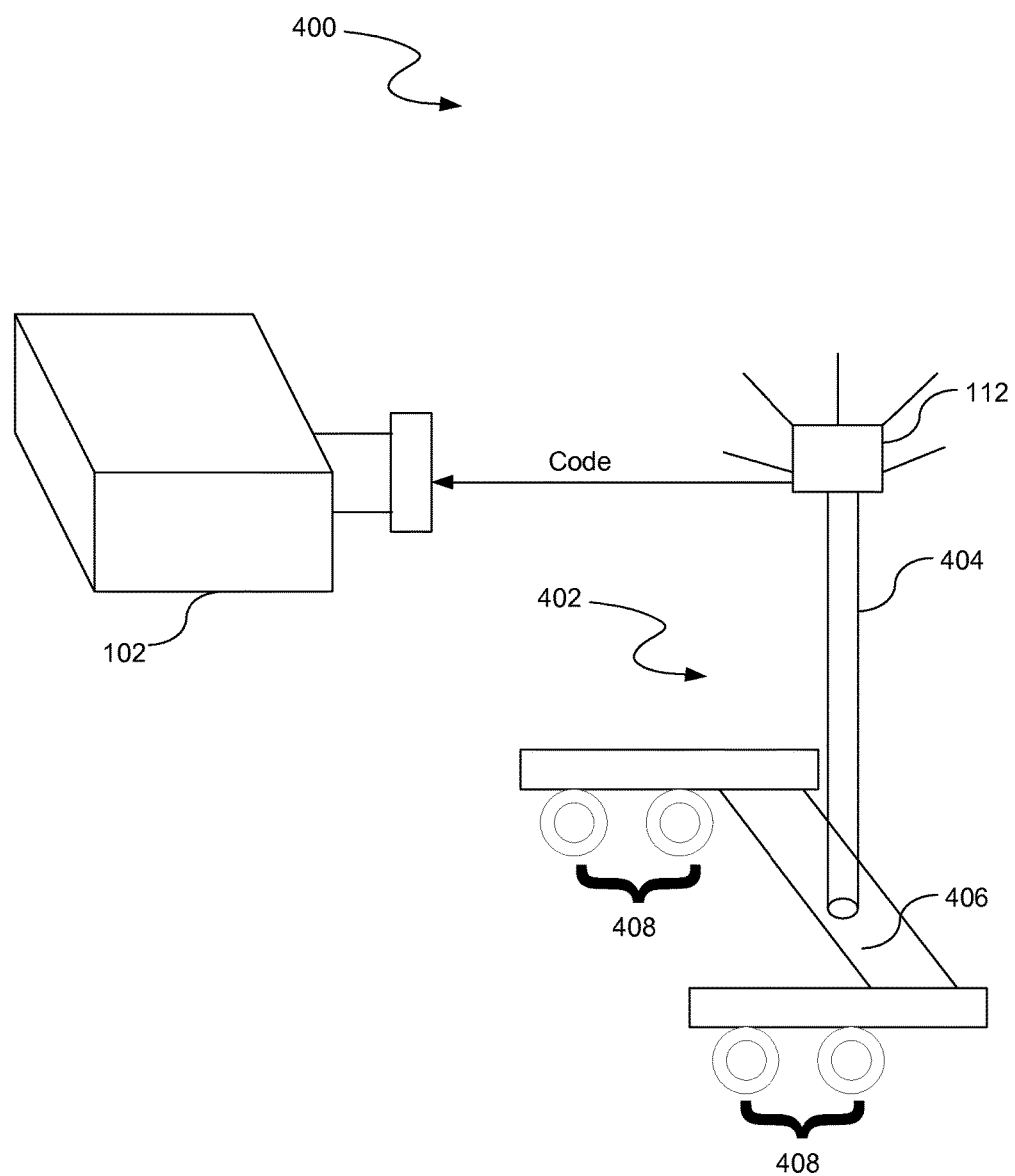
FIG. 4 illustrates a robotic configuration that is utilized for calibration.

FIG. 4 illustrates a robotic configuration 400 that is utilized for calibration. The light emitter 112 is positioned on a robotic platform 402. The robotic platform 402 may move the light emitter 112 along the x, y, and/or z coordinate planes. For example, the robotic platform 402 moves a rod 404 up and down along the y coordinate plane. Further, the robotic platform 402 moves a base plate 406 forward or backward along an x coordinate plane and/or sideways along a z coordinate plane. In one aspect, the robotic platform 402 has a plurality of wheels 408 or other movement apparatus that moves the robotic platform 402 to different locations. Movement of the rod 404 and the base plate 406 may be utilized in conjunction with or independently of the plurality of wheels 408.

In one aspect, the robotic platform 402 is instructed to automatically move the light emitter 112 to various positions. As a result, light emitter is able to emit absolute (x, y, z) coordinates without human error to the image capture device 102. Further, the robotic platform 402 assists in identifying the ground plane as the robotic platform is resting on the ground.

Figure 5:
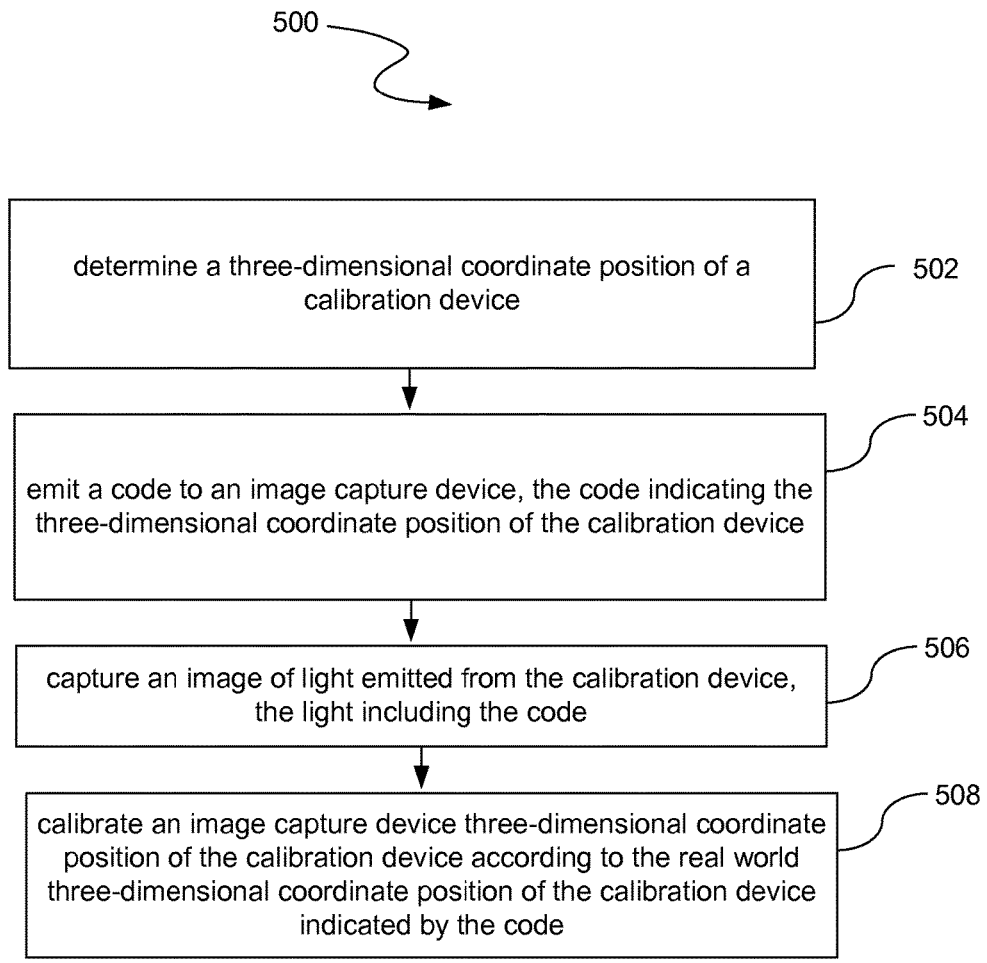
FIG. 5 illustrates a process that is utilized to provide calibration.

FIG. 5 illustrates a process 500 that is utilized to provide calibration. At a process block 502, the process 500 process determines a three-dimensional coordinate position of a calibration device. Further, at a process block 504, the process 500 emits a code to an image capture device. The code indicates the three-dimensional coordinate position of the calibration device. In addition, at a process block 506, the process 500 captures an image of light emitted from the calibration device. The light includes the code. At a process block 508, the process 500 also calibrates an image capture device three-dimensional coordinate position of the calibration device according to the real world three-dimensional coordinate position of the calibration device indicated by the code.

In another aspect, the light emitter 112 illustrated in FIG. 1 may have metric properties. Such metric properties allow for faster and more reliable measurements. As an example, a plurality of LEDs is spaced apart at predetermined distances along a rod. Such measurements allow for reliable identification of the ground plane. Further, other measurement information may be utilized such as only allowing a rod to emit light if the rod is held absolutely vertical.

In yet another aspect, the calibration methodology is utilized for an expanding structure. A plurality of LEDs is mounted at particular locations of the expanding structure. As the structure expands, a plurality of vectors is measured.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or a computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. An image capture device comprising:
    an image capture sensor that captures an image of light emitted from a calibration device, the light including a code that indicates a set of real world three-dimensional coordinate positions of the calibration device; and
    a controller that calibrates at least one intrinsic parameter and at least one extrinsic parameter according to the set of real world three-dimensional coordinate positions of the calibration device indicated by the code.

2. The image capture device of claim 1, further comprising a transmitter that sends diagnostic data to the calibration device based upon the calibration.

3. The image capture device of claim 1, wherein the controller decodes the code to determine the real world three-dimensional coordinate position of the calibration device.

4. The camera calibration device of claim 1, further comprising a demodulator that demodulates the light from the calibration device to obtain the code.

5. The camera calibration device of claim 4, further comprising a decoder that decodes the code to determine the set of real world three-dimensional coordinate positions of the calibration device.

6. A system comprising:
    a calibration device that includes a controller and at least one light emitter, the controller determining a three-dimensional coordinate position of the calibration device, the at least one light emitter emitting a code to an image capture device, the code indicating the three-dimensional coordinate position of the calibration device; and
    an image capture device that includes an image capture sensor and a controller, the image capture sensor capturing an image of light emitted from a calibration device, the light including the code, the controller calibrating an image capture device three-dimensional coordinate position of the calibration device according to the real world three-dimensional coordinate position of the calibration device indicated by the code.

7. The system of claim 6, wherein the at least one light emitter is at least one LED emitter.

8. The system of claim 6, wherein the at least one light emitter is a display screen of the calibration device.

9. The system of claim 6, wherein the calibration device further includes a receiver that receives diagnostic data from the image capture device after the image capture device performs calibration based upon the code.

10. The system of claim 9, wherein the three-dimensional coordinate position is adjusted based upon the diagnostic data.

11. The system of claim 6, wherein the calibration device further includes an input receiver that receives an input indicating data in addition to the three-dimensional coordinate position.

12. The system of claim 11, wherein the code includes the input in addition to the three-dimensional coordinate position.

13. The system of claim 6, wherein the image capture device further includes a transmitter that sends diagnostic data to the calibration device based upon the calibration.

14. The system of claim 6, wherein the controller decodes the code to determine the real world three-dimensional coordinate position of the calibration device.

15. A method comprising:
    determining a three-dimensional coordinate position of a calibration device;
    emitting a code to an image capture device, the code indicating the three-dimensional coordinate position of the calibration device;
    capturing an image of light emitted from the calibration device, the light including the code; and
    calibrating an image capture device three-dimensional coordinate position of the calibration device according to the real world three-dimensional coordinate position of the calibration device indicated by the code.

16. The method of claim 15, wherein the at least one light emitter is at least one LED emitter.

17. The method of claim 15, wherein the at least one light emitter is a display screen of the calibration device.

18. The method of claim 15, wherein the calibration device further includes a receiver that receives diagnostic data from the image capture device after the image capture device performs calibration based upon the code.

19. The method of claim 18, further comprising adjusting the three-dimensional coordinate position based upon the diagnostic data.

20. The method of claim 15, wherein the calibration device further includes an input receiver that receives an input indicating data in addition to the three-dimensional coordinate position.

21. The method of claim 20, wherein the code includes the input in addition to the three-dimensional coordinate position.

22. The method of claim 15, further comprising sending diagnostic data to the calibration device based upon the calibration.

23. The method of claim 15, further comprising decoding the code to determine the real world three-dimensional coordinate position of the calibration device.

\* \* \* \* \*